United States Patent
Tang et al.

(10) Patent No.: US 11,189,835 B2
(45) Date of Patent: Nov. 30, 2021

(54) ANODE FOR SECONDARY BATTERY, PREPARATION METHOD THEREOF AND SECONDARY BATTERY

(71) Applicant: REAL POWER INDUSTRIAL LIMITED COMPANY, Shenzhen (CN)

(72) Inventors: Yongbing Tang, Nanshan Shenzhen (CN); Chengde Xie, Nanshan Shenzhen (CN)

(73) Assignee: REAL POWER INDUSTRIAL LIMITED COMPANY, Guangdong (CN)

( * ) Notice: Subject to any disclaimer, the term of this patent is extended or adjusted under 35 U.S.C. 154(b) by 163 days.

(21) Appl. No.: 16/495,065

(22) PCT Filed: Mar. 24, 2017

(86) PCT No.: PCT/CN2017/078206
§ 371 (c)(1),
(2) Date: Sep. 17, 2019

(87) PCT Pub. No.: WO2018/170928
PCT Pub. Date: Sep. 27, 2018

(65) Prior Publication Data
US 2020/0099056 A1 Mar. 26, 2020

(51) Int. Cl.
*H01M 4/00* (2006.01)
*H01M 4/66* (2006.01)
(Continued)

(52) U.S. Cl.
CPC ....... *H01M 4/662* (2013.01); *H01M 10/0569* (2013.01); *H01M 2004/027* (2013.01);
(Continued)

(58) Field of Classification Search
CPC .... H01M 4/136; H01M 4/049; H01M 4/1345; H01M 4/1397; H01M 2004/027
See application file for complete search history.

(56) References Cited

FOREIGN PATENT DOCUMENTS

| CN | 1314008 A | 9/2001 |
|---|---|---|
| CN | 101235529 A | 8/2008 |

(Continued)

OTHER PUBLICATIONS

The First Office Action issued corresponding CN application No. 201710184320.0 dated Mar. 2, 2020.
(Continued)

*Primary Examiner* — Cynthia H Kelly
*Assistant Examiner* — Monique M Wills
(74) *Attorney, Agent, or Firm* — Fish IP Law (57) ABSTRACT

Provided are anode for secondary battery, preparation method thereof and secondary battery. The anode comprises metal foil and a compact film of metal phosphates disposed on a surface of the metal foil, wherein the compact film of metal phosphates comprises one or more of aluminum phosphate, copper phosphate, iron phosphate, tin phosphate, zinc phosphate, nickel phosphate, manganese phosphate, lead phosphate, antimony phosphate, cadmium phosphate and bismuth phosphate. Disposed on the surface of the metal foil is a film of metal phosphates which insulates against electrons and is arranged such that metallic ions such as lithium ions can pass therethrough. The film of metal phosphates functions like a solid electrolyte interphase, improves the compatibility of the anode with the electrolyte solution, reduces the decomposition of the electrolyte solution, and improves charging and discharging efficiency, cyclability, high and low temperatures performance and safety performance of battery.

11 Claims, 2 Drawing Sheets

(51) Int. Cl.
*H01M 10/0569* (2010.01)
*H01M 4/02* (2006.01)
(52) U.S. Cl.
CPC ............. *H01M 2004/028* (2013.01); *H01M 2300/0042* (2013.01)

(56) References Cited

FOREIGN PATENT DOCUMENTS

| | | | | |
|---|---|---|---|---|
| CN | 101276887 A | 10/2008 | | |
| CN | 101320626 A | 12/2008 | | |
| CN | 102110839 A | 6/2011 | | |
| CN | 102376927 A | 3/2012 | | |
| CN | 102738450 A | * 10/2012 | ............. | Y02E 60/10 |
| CN | 102812580 A | 12/2012 | | |
| CN | 105018776 A | 11/2015 | | |
| CN | 105406125 A | 3/2016 | | |
| CN | 105449186 A | 3/2016 | | |
| CN | 105594020 A | 5/2016 | | |
| CN | 106340651 A | 1/2017 | | |
| CN | 106449155 A | 2/2017 | | |
| CN | 205944146 U | 2/2017 | | |
| JP | 2001057181 A | 2/2001 | | |
| JP | 2006156315 A | 6/2006 | | |

OTHER PUBLICATIONS

The Second Office Action issued corresponding CN application No. 201710184320.0 dated Aug. 13, 2020.
International search report issued in corresponding international application No. PCT/CN2017/078206 dated Oct. 12, 2017.

* cited by examiner

ANODE FOR SECONDARY BATTERY, PREPARATION METHOD THEREOF AND SECONDARY BATTERY

FIELD OF THE INVENTION

The present invention relates to the field of secondary battery, in particular to an anode for a secondary battery, preparation method thereof, and a secondary battery.

BACKGROUND OF THE INVENTION

In 2016, Prof. Tang Yongbing and his team from the Shenzhen Institute of Advanced Technology of the Chinese Academy of Sciences made a breakthrough in the research of a new high-efficiency battery and developed a novel aluminum-graphite dual-ion battery, which was published in *Advanced Energy Materials* (DOI: 10.1002/aenm. 201502588). Such a battery has inexpensive graphite as cathode and aluminum foil as both current collector and anode active material, making it different from the existing conventional batteries. In August, they published an article titled *Carbon-Coated Porous Aluminum Foil Anode for High-Rate, Long-Term Cycling Stability and High Energy Density Dual-Ion Batteries* in the famous journal *Advanced Materials* (DOI: 10.1002/adma. 201603735). Such a novel high-efficiency battery system, in which aluminum foil is used as an anode plate, has improved specific energy density and at lower cost, thus having a good prospect of application. The research team fully recognized the problems in using aluminum foil as an anode plate, and proposed processing the aluminum foil into carbon-coated porous aluminum foil to solve the problem of volume expansion and poor compatibility of the aluminum foil with electrolyte solution. Their findings showed that the solution they proposed can effectively solve the problem caused by using aluminum foil as the anode.

The compatibility between anode and electrolyte solution may be improved by coating carbon material on the surface of aluminum foil, but there is still a problem that the electrolyte solution tends to decompose and form solid electrolyte interphase. Moreover, the method for coating carbon is complex and costly.

SUMMARY OF THE INVENTION

In view of the above problems, the present invention aims to improve charging and discharging efficiency, cyclability and safety performance of a battery by providing a compact film of metal phosphates disposed on the surface of metal foil.

In a first aspect the present invention provides an anode for a secondary battery, comprising metal foil and a compact film of metal phosphates disposed on a surface of the metal foil, wherein the metal foil acts as both an anode current collector and an anode active material, and the metal foil comprises any one of aluminum, copper, iron, tin, zinc, nickel, manganese, lead, antimony, cadmium and bismuth, or comprises an alloy containing at least one of aluminum, copper, iron, tin, zinc, nickel, manganese, lead, antimony, cadmium and bismuth, and wherein the compact film of metal phosphates comprises one or more of aluminum phosphate, copper phosphate, iron phosphate, tin phosphate, zinc phosphate, nickel phosphate, manganese phosphate, lead phosphate, antimony phosphate, cadmium phosphate and bismuth phosphate.

In some embodiments, a metallic element of the film of metal phosphates is the same as a metallic element of the metal foil.

In some embodiments, a surface layer of the metal foil has a three-dimensional porous structure with a pore size in a range of 10 nm-20 μm.

In some embodiments, the surface layer has a thickness in a range of 1 nm-10 μm, and a ratio of the thickness of the surface layer to that of the metal foil is in a range of 1:10-10000.

In some embodiments, the film of metal phosphates has a thickness of 1 nm-3 μm, and a ratio of the thickness of the film of metal phosphates to that of the metal foil is in a range of 1:30-10000.

In the anode for a secondary battery provided by the first aspect of the invention, disposed on the surface of the metal foil is a film of metal phosphates which insulates against electrons and is arranged such that metallic ions such as lithium ions can pass therethrough. The film of metal phosphates functions like a solid electrolyte interphase, improves the compatibility of the anode with the electrolyte solution, reduces the decomposition of the electrolyte solution, and improves charging and discharging efficiency, cyclability, high and low temperatures performance and safety performance of a battery.

In a second aspect the present invention provides a method for preparing an anode for a secondary battery, comprising: providing a raw material for metal foil; reacting the raw material for metal foil with a phosphate-containing solution, alternatively forming a compact film of metal phosphates on a surface of the raw material for metal foil by depositing so as to prepare the anode for the secondary battery; and wherein the anode for the secondary battery comprises metal foil and the compact film of metal phosphates disposed on a surface of the metal foil, wherein the metal foil acts as both an anode current collector and an anode active material, and the metal foil comprises any one of aluminum, copper, iron, tin, zinc, nickel, manganese, lead, antimony, cadmium and bismuth, or comprises an alloy containing at least one of aluminum, copper, iron, tin, zinc, nickel, manganese, lead, antimony, cadmium and bismuth, and wherein the compact film of metal phosphates comprises one or more of aluminum phosphate, copper phosphate, iron phosphate, tin phosphate, zinc phosphate, nickel phosphate, manganese phosphate, lead phosphate, antimony phosphate, cadmium phosphate and bismuth phosphate.

In some embodiments, the step of reacting the raw material for metal foil with a phosphate-containing solution comprises: immersing the raw material for metal foil in the phosphate-containing solution at a temperature of 0° C.-80° C. for 1-600 minutes, followed by washing and drying it to obtain the anode for the secondary battery.

In some embodiments, the phosphate-containing solution comprises at least one of a solution of phosphoric acid, a solution of dihydrogen phosphate, a solution of monohydrogen phosphate, a solution of pyrophosphoric acid, a solution of pyrophosphate, a solution of metaphosphoric acid, and a solution of metaphosphate, and the percent by mass of the solute in the phosphate-containing solution is in a range of 5%-85%.

In some embodiments, the step of drying is performed at 40° C.-120° C. for 30-600 minutes.

The preparation method provided by the second aspect of the invention is simple and feasible, inexpensive, and applicable to commercial process, and it is able to produce anodes for a secondary battery with high consistency and uniformity and stability.

A third aspect the present invention provides a secondary battery comprising a cathode, an electrolyte solution, a separator, and the anode as described in the first aspect of the invention.

In some embodiments, the electrolyte solution comprises an electrolyte and a solvent, the electrolyte comprising one or more of a salt of lithium, a salt of sodium, a salt of potassium, a salt of magnesium and a salt of calcium. The concentration of the electrolyte in the electrolyte solution is in a range of 0.1-10 mol/L.

The secondary battery provided by the third aspect of the invention has better charging and discharging efficiency, cyclability, high power performance, high and low temperatures performance and safety performance.

In summary, the present invention has advantages as follows.

First, in an anode for a secondary battery provided by the invention, disposed on the surface of the metal foil is a film of metal phosphates, which insulates against electrons and is arranged such that metallic ions such as lithium ions can pass therethrough. The film of metal phosphates functions like a solid electrolyte interphase, improves the compatibility of the anode with the electrolyte solution, reduces the decomposition of the electrolyte solution, and improves charging and discharging efficiency, cyclability, high and low temperatures performance and safety performance of a battery.

Second, the preparation method provided by the invention is simple and feasible, inexpensive, and applicable to commercial process, and it is able to produce anodes for a secondary battery with high consistency and uniformity and stability.

Third, a secondary battery provided by the invention has better charging and discharging efficiency, cyclability, high power performance, high and low temperatures performance and safety performance.

DETAILED DESCRIPTION OF THE INVENTION

The following are preferred embodiments of the present invention. It should be noted that various other changes and modifications can be made without departing from the scope of the disclosure. Accordingly, it is therefore intended that the present invention covers all such changes and modifications.

In a first aspect the present invention provides an anode for a secondary battery, comprising metal foil and a compact film of metal phosphates disposed on a surface of the metal foil, wherein the metal foil acts as both an anode current collector and an anode active material, and the metal foil comprises any one of aluminum, copper, iron, tin, zinc, nickel, manganese, lead, antimony, cadmium and bismuth, or comprises an alloy containing at least one of aluminum, copper, iron, tin, zinc, nickel, manganese, lead, antimony, cadmium and bismuth, and wherein the compact film of metal phosphates comprises one or more of aluminum phosphate, copper phosphate, iron phosphate, tin phosphate, zinc phosphate, nickel phosphate, manganese phosphate, lead phosphate, antimony phosphate, cadmium phosphate and bismuth phosphate.

In some embodiments of the present invention, the film of metal phosphates may be disposed on one side of the metal foil or the entire surface of the metal foil, depending on a specific instance. In the case where the secondary battery is a half-cell, the film of metal phosphates may be disposed only on a surface of the metal foil in proximity to the separator. In the case where the secondary battery is a full battery or used in a commercial battery pack, the film of metal phosphates may be disposed on the opposite sides of the metal foil or on the entire surface of the metal foil. It can be understood that on the metal foil there is a bare area for soldering the tabs, and the area is not covered by the film of metal phosphates.

In some embodiments of the present invention, the secondary battery may be a conventional battery such as lithium ion secondary battery and sodium ion secondary battery, or a dual-ion battery.

When the porous aluminum foil of the prior art is used as both anode active material and current collector, it is likely to form a compact film of aluminum oxide on the surface of the aluminum foil due to the high activity of the aluminum foil. During a charging process of a battery, a substitution reaction between lithium ion and aluminum oxide may firstly occur. After that, aluminum in the compact film of aluminum oxide on the surface of the aluminum foil may be alloyed with lithium ion, while the electrolyte solution contacting the surface of the aluminum foil may be decomposed to form a solid electrolyte interphase. The aluminum-lithium alloying process may lead to volume expansion which may damage the solid electrolyte interphase. Accordingly, the electrolyte solution may decompose again to form solid electrolyte interphase to make up for the destruction of the previous solid electrolyte interphase. As the aluminum-lithium alloying process proceeds on the aluminum foil, the volume expansion of aluminum foil gradually increases, and the electrolyte solution continues to decompose. During a discharging process, the volume of the aluminum foil reduces, and the solid electrolyte interphase is damaged to some extent. Therefore, during the charging and discharging process of a battery, especially during the first few cycles of charging and discharging, the electrolyte solution may decompose seriously, and thus lead to a relatively low charging and discharging efficiency.

In the embodiment of the present invention, the film of metal phosphates insulates against electrons, and enables metallic ions such as lithium ions to pass through. The film of metal phosphates functions like a solid electrolyte interphase. The anode for a secondary battery acts both as an anode active material and an anode current collector. In the case where such anode is used as an anode, due to the electron-insulating layer provided on its surface, it is possible to prevent the electrolyte solution from coming into contact with the anode active material, and avoid the decomposition of the electrolyte solution, and thus improve the stability of the electrolyte solution. Metallic ions in the electrolyte or the cathode active material, such as lithium ions, may pass through the film of metal phosphates and form with metal foil material, such as aluminum, a lithium-aluminum alloy, and dealloy, thereby achieving charging and discharging of the battery. Moreover, the metal phosphate on the surface of the metal foil is a main inorganic component of the solid electrolyte interphase, and it is advantageous to reduce the impedance of the solid electrolyte interphase due to its good lithium-ion-conducting property. In addition, since the film of metal phosphates is formed on the surface of the metal foil, it provides good adhesion and good protection for the metal foil substrate, improves the compatibility between the anode and the electrolyte solution, and improves charging and discharging efficiency, cyclability, and safety performance of a battery.

In some embodiments of the present invention, the metal foil comprises a metal in an elemental form or an alloy of metals, and specifically may be such as elemental aluminum, copper, iron, tin, zinc, nickel, manganese, lead, antimony, cadmium, bismuth, copper-tin alloy, aluminum-tin alloy, aluminum-titanium alloy, iron-tin alloy, in which percentage of each element of the alloy may be conventional.

In some embodiments of the invention, a metallic element of the film of metal phosphates is the same as a metallic element of the metal foil. For example, in the case where the metal foil is aluminum foil, the film of metal phosphates is a film of aluminum phosphate. In the case where the metal foil is copper foil, the film of metal phosphates is a film of copper phosphate. The metallic element of the film of metal phosphates may be consistent with the metallic element of the metal foil.

In some embodiments of the invention, the surface layer of the metal foil has a three-dimensional porous structure with a pore size in a range of 10 nm-20 µm. Alternatively, the pore size is in a range of 10 nm-100 nm. Alternatively, the pore size is in a range of 1 µm-20 µm. The surface layer of the metal foil has a three-dimensional porous structure, which provides more passages for metallic ions such as lithium ions to transfer, and facilitates intercalation and deintercalation of lithium ions, thereby improving high power performance of a battery. In addition, the volume expansion of the metal foil anode plate during charging and discharging of a battery is alleviated, which is advantageous for improving the cyclability performance of such battery.

In some embodiments of the invention, the surface layer has a thickness in a range of 1 nm-10 µm. Alternatively, the surface layer has a thickness in a range of 1 nm-100 nm. Alternatively, the surface layer has a thickness in a range of 1 µm-10 µm. Alternatively, a ratio of the thickness of the surface layer to that of the metal foil is in a range of 1:10-10000. Alternatively, a ratio of the thickness of the surface layer to that of the metal foil is in a range of 1:10-100. Alternatively, a ratio of the thickness of the surface layer to that of the metal foil is in a range of 1:1000-10000.

In some embodiments of the invention, the film of metal phosphates is arranged to be tightly adhered to the surface layer.

In some embodiments of the invention, the film of metal phosphates has a thickness in a range of 1 nm to 3 µm. Alternatively, the film of metal phosphates has a thickness in a range of 1 nm to 100 nm. Alternatively, the film of metal phosphates has a thickness in a range of 100 nm to 3 µm. Alternatively, a ratio of the thickness of the film of metal phosphates to that of the metal foil is in a range of 1:30-10000. Alternatively, a ratio of the thickness of the film of metal phosphates to that of the metal foil is in a range of 1:30-100. Alternatively, a ratio of the thickness of the film of metal phosphates to that of the metal foil is in a range of 1:100-10000.

In the anode for secondary battery provided by the first aspect of the invention, disposed on the surface of the metal foil is a film of metal phosphates which insulates against electrons and is arranged such that metallic ions such as lithium ions can pass therethrough. The film of metal phosphates functions like a solid electrolyte interphase, improves the compatibility of the anode with the electrolyte solution, reduces the decomposition of the electrolyte solution, and improves charging and discharging efficiency, cyclability, high and low temperatures performance and safety performance of the battery. In addition, the present invention is the first to propose treating the surface of metal foil to act as both an anode active material and a current collector and growing a solid electrolyte interphase thereon. In this way, it is possible to broaden the range of solvents for the electrolyte solution, thereby achieving comprehensive battery performance and expanding the application of such battery by an optimal choice of the solvent for electrolyte solution.

In a second aspect the present invention provides a method for preparing an anode for a secondary battery, comprising: providing a raw material for metal foil; reacting the raw material for metal foil with a phosphate-containing solution, alternatively forming a compact film of metal phosphates on a surface of the raw material for metal foil by depositing so as to prepare the anode for the secondary battery; and wherein the anode for the secondary battery comprises metal foil and the compact film of metal phosphates disposed on a surface of the metal foil, and wherein the metal foil acts as both an anode current collector and an anode active material, and the metal foil comprises any one of aluminum, copper, iron, tin, zinc, nickel, manganese, lead, antimony, cadmium and bismuth, or comprises an alloy containing at least one of aluminum, copper, iron, tin, zinc, nickel, manganese, lead, antimony, cadmium and bismuth, and wherein the compact film of metal phosphates comprises one or more of aluminum phosphate, copper phosphate, iron phosphate, tin phosphate, zinc phosphate, nickel phosphate, manganese phosphate, lead phosphate, antimony phosphate, cadmium phosphate and bismuth phosphate.

In some embodiments of the present invention, the film of metal phosphates may be disposed on one side of the metal foil or the entire surface of the metal foil, depending on a specific instance. In the case where the secondary battery is a half-cell, the film of metal phosphates may be disposed only on a surface of the metal foil in proximity to the separator. In the case where the secondary battery is a full battery or used in a commercial battery pack, the film of metal phosphates may be disposed on the opposite sides of the metal foil or on the entire surface of the metal foil. It can be understood that on the metal foil there is a bare area for soldering the tabs, and the area is not covered by the film of metal phosphates.

In some embodiments of the invention, the step of reacting the raw material for metal foil with a phosphate-containing solution comprises: immersing the raw material for metal foil in the phosphate-containing solution at a temperature of 0° C.-80° C. for 1-600 minutes, followed by washing and drying it to obtain the anode for the secondary battery.

In such embodiment of the invention, the raw material for metal foil may be completely immersed in the phosphate-containing solution. After the reaction, obtained is metal foil having a compact film of metal phosphates disposed on the entire surface. The film of metal phosphates on the side of the metal foil away from the separator is ground to obtain an anode provided with the film of metal phosphates only on one side of the metal foil. Alternatively, before the step of immersing, protective material is attached to one side of the raw material for metal foil so as to avoid the metal foil on this side being reacted with the phosphate-containing solution, and then the raw material for metal foil is immersed in the phosphate-containing solution. In this way, after the immersion is completed, the film of metal phosphates only forms on one side of the raw material for metal foil.

In such embodiment of the invention, the raw material for metal foil is placed in a phosphate-containing solution to perform a chemical reaction to remove a layer of oxides on the surface of the raw material for metal foil and obtain a compact film of metal phosphates, thereby improving charging and discharging efficiency and cyclability performance of the battery. During the reaction between the raw material for metal foil and the phosphate-containing solution, the phosphate-containing solution corrodes the surface of the raw material for metal foil to form a three-dimensional porous structure which facilitates intercalation and deintercalation of lithium ions, thereby improving the high power performance of the battery. During the corrosion process, the metal phosphate formed from the phosphate and the raw material for metal foil is deposited in situ on the surface of the raw material for metal foil to obtain the anode for the secondary battery, wherein the anode for the secondary battery comprises the metal foil and the compact film of metal phosphates disposed on the surface of the metal foil. Due to the corrosion reaction, thickness of the metal foil may be less than that of the raw material for metal foil.

In some embodiments, the phosphate-containing solution comprises at least one of a solution of phosphoric acid, a solution of dihydrogen phosphate, a solution of monohydrogen phosphate, a solution of pyrophosphoric acid, a solution of pyrophosphate, a solution of metaphosphoric acid, and a solution of metaphosphate. Specifically, the phosphate-containing solution comprises at least one of phosphoric acid, sodium dihydrogen phosphate, sodium monohydrogen phosphate, pyrophosphoric acid, metaphosphoric acid, sodium pyrophosphate, potassium pyrophosphate, potassium dihydrogen phosphate, potassium monohydrogen phosphate, sodium metaphosphate, potassium metaphosphate, copper pyrophosphate, potassium phosphate, tetrametaphosphoric acid, and sodium hexametaphosphate. Alternatively, the percent by mass of the solute in the phosphate-containing solution is in a range of 5%-85%. Alternatively, the phosphate-containing solution is a solution formed by mixing an oxyacid of phosphorus or a salt thereof with water.

In some embodiments of the invention, the step of immersing is performed at 10° C.-40° C. for 30-600 minutes.

In some embodiments of the present invention, the step of washing comprises washing with water the metal foil raw material obtained after the reaction for two or three times.

In some embodiments of the present invention, the step of drying is performed at 40° C.-120° C. for 30-600 minutes. Alternatively, the step of drying is performed at 80° C.-110° C. for 120-400 minutes.

In another embodiment of the present invention, the step of forming a compact film of metal phosphates on a surface of the raw material for metal foil by depositing comprises: employing chemical vapor deposition or physical deposition process to deposit metal phosphates on the surface of the raw material for metal foil and form the compact film of metal phosphates to prepare the anode for the secondary battery; and wherein the anode for the secondary battery comprises the metal foil and the compact film of metal phosphates disposed on the surface of the metal foil.

In some embodiments of the present invention, during the deposition process, a specific instrument can be used to shield one side of the metal foil to ensure that the film would not deposit on that side. After the deposition is completed, metal phosphate can be disposed only on one side of the metal foil. Alternatively, both sides or all surfaces of the raw material for metal foil may be exposed to the vapor deposition chamber so that that the film of metal phosphates can be disposed on both sides or all surfaces of the metal foil.

The preparation method provided by the second aspect of the invention is simple and feasible, inexpensive, and applicable to commercial process, and it is able to produce anodes for a secondary battery with high consistency and uniformity and stability.

In a third aspect the present invention provides a secondary battery comprising a cathode, an electrolyte solution, a separator, and the anode as described in the first aspect of the invention.

In the embodiment of the present invention, in the case where the film of metal phosphates is disposed on only one side of the metal foil, when the battery is assembled, the side of the metal foil provided with the film of metal phosphates should be adjacent to the separator while the other side provided without the film of metal phosphates should be away from the separator.

In some embodiments of the present invention, the secondary battery provided by the present invention may be a lithium ion secondary battery, a potassium ion secondary battery, a magnesium ion secondary battery, a sodium ion secondary battery, a calcium ion secondary battery, or a dual-ion battery. Accordingly, the cathode active material may be selected from the group consisting of conventional cathode active material for a sodium ion secondary battery, a lithium ion secondary battery, a magnesium ion secondary battery, a sodium ion secondary battery, a calcium ion secondary battery, and a dual-ion battery. Alternatively, cathode active material for a sodium ion secondary battery may be selected from one or more of sodium phosphate containing polyanion compound, compound with tunnel structure, spinel oxide, and layered transition metal oxide. Alternatively, cathode active material for a lithium ion secondary battery may be selected from one or more of lithium cobalt oxide, lithium nickel oxide, lithium manganese oxide or lithium-containing polyanion cathode active material; such as, lithium iron phosphate, lithium cobaltate and nickel cobalt manganese ternary cathode material. Alternatively, cathode active material for a magnesium ion secondary battery comprises one or more of a metal oxide of magnesium, a metal sulfide of magnesium or a magnesium-containing polyanion compound. Cathode active material for a dual ion battery may be selected from one or more of a carbon material, a sulfide, a nitride, an oxide, and a carbide. Furthermore, the carbon material comprises one or more of graphite-based carbon material, glassy carbon, carbon-carbon composite material, carbon fiber, hard carbon, porous carbon, carbon black, carbon nanotubes, and graphene.

The graphite-based carbon material comprises one or more of natural graphite, expanded graphite, artificial graphite, mesocarbon microbead graphite, pyrolytic graphite, highly oriented graphite, and three-dimensional graphite sponge.

The sulfide is selected from one or more of molybdenum disulfide, tungsten disulfide, vanadium disulfide, titanium disulfide, iron disulfide, ferrous sulfide, nickel sulfide, zinc sulfide, cobalt sulfide and manganese sulfide. The nitride is selected from one or more of hexagonal boron nitride and carbon doped hexagonal boron nitride. The oxide is selected from one or more of molybdenum trioxide, tungsten trioxide, vanadium pentoxide, vanadium dioxide, titanium dioxide, zinc oxide, copper oxide, nickel oxide, and manganese oxide. The carbide is selected from one or more of titanium carbide, tantalum carbide, molybdenum carbide, and silicon carbide.

The material for the cathode current collector comprises any one of aluminum, copper, iron, tin, zinc, nickel and titanium, manganese, or comprises an alloy or a composite material containing at least one of aluminum, copper, iron, tin, zinc, nickel, titanium and manganese.

In some embodiments of the invention, the electrolyte solution comprises an electrolyte and a solvent. The electrolyte comprises one or more of a salt of lithium, a salt of sodium, a salt of potassium, a salt of magnesium and a salt of calcium. The concentration of the electrolyte in the electrolyte solution is in a range of 0.1-10 mol/L. Specifically, the salt of lithium may be selected from one or more of lithium hexafluorophosphate, lithium tetrafluoroborate, lithium perchlorate, etc. Furthermore, the salt of lithium may be lithium hexafluorophosphate. The salt of sodium may be selected from one or more of sodium chloride, sodium fluoride, sodium sulfate, sodium carbonate, sodium phosphate, sodium nitrate, sodium difluorooxalate borate, sodium pyrophosphate, sodium dodecylbenzenesulfonate, sodium lauryl sulfate, trisodium citrate, sodium metaborate, sodium borate, sodium molybdate, sodium tungstate, sodium bromide, sodium nitrite, sodium iodate, sodium iodide, sodium silicate, sodium lignosulfonate, sodium hexafluorophosphate, sodium oxalate, sodium aluminate, sodium methanesulfonate, sodium acetate, sodium dichromate, sodium hexafluoroarsenate, sodium tetrafluoroborate, sodium perchlorate, sodium trifluoromethanesulfonimide (NaTFSI), $LiCF_3SO_3$ and $LiN(SO_2CF_3)_2$. Furthermore, the salt of sodium may be sodium hexafluorophosphate. The salt of potassium may be selected from one or more of potassium chloride, potassium fluoride, potassium sulfate, potassium carbonate, potassium phosphate, potassium nitrate, potassium difluorooxalate borate, potassium pyrophosphate, potassium dodecylbenzenesulfonate, potassium lauryl sulfate, tripotassium citrate, potassium metaborate, potassium borate, potassium molybdate, potassium tungstate, potassium bromide, potassium nitrite, potassium iodate, potassium iodide, potassium silicate, potassium lignosulfonate, potassium oxalate, potassium aluminate, potassium methanesulfonate, potassium acetate, potassium dichromate, potassium hexafluoroarsenate, potassium tetrafluoroborate, potassium perchlorate, potassium trifluoromethanesulfonimide (KTFSI), $KCF_3SO_3$ and $KN(SO_2CF_3)_2$. Furthermore, the salt of potassium may be potassium hexafluorophosphate. The salt of magnesium may be selected from the group consisting of an organic salt of magnesium or an inorganic salt of magnesium. The organic salt of magnesium may be selected from the Grignard reagent RMgX, including but not limited to one or more of N-methylaniline magnesium bromide, pyrrolyl magnesium bromide, disodium magnesium edetate (EDTA-Mg), N,N-bis(trimethylsilyl)aminomagnesium chloride, $Mg(SnPh_3)_2$, $Mg(BR_2R'_2)_2$, $Mg(AZ_{3-n}R_n, R'_{n''})_2$ type complexes, where R is an alkyl group, X is a halogen, A is Al, B, As, P, Sb, Ta or Fe, and Z is Cl or Br, and R' is an aryl group, and n'+n''=n. The inorganic salt of magnesium may be selected from one or more of $Mg(ClO_4)_2$, $Mg(BF_4)_2$, $Mg(PF_6)_2$, $MgCl_2$, $MgBr_2$, $MgF_2$, $MgI_2$, $Mg(NO_3)_2$, $MgSO_4$, $Mg(SCN)_2$, $MgCrO_4$ and $Mg(CF_3SO_3)_2$. The salt of calcium may be selected from one or more of calcium hexafluorophosphate, calcium tetrafluoroborate, calcium chloride, calcium carbonate, calcium sulfate, calcium nitrate, calcium fluoride, calcium triflate and calcium perchlorate.

In some embodiments of the present invention, the solvent in the electrolyte solution is not limited as long as the electrolyte can be dissociated into metallic ions and anions that can freely transfer. Specifically, the solvent may be a non-aqueous solvent or an aqueous solvent, and the non-aqueous solvent may be an organic solvent or an ionic liquid. The organic solvent may be selected from one or more of esters, sulfones, ethers, and the like. The preferred organic solvents may be selected from one or more of propylene carbonate (PC), ethylene carbonate (EC), diethyl carbonate (DEC), dimethyl carbonate (DMC), ethyl methyl carbonate (EMC), methyl formate (MF), methyl acetate (MA), N,N-dimethylacetamide (DMA), fluoroethylene carbonate (FEC), methyl propionate (MP), ethyl propionate (EP), ethyl acetate (EA), γ-butyrolactone (GBL), tetrahydrofuran (THF), 2-methyltetrahydrofuran (2MeTHF), 1,3-dioxolane (DOL), 4-methyl-1,3-dioxolane (4MeDOL), dimethoxymethane (DMM), 1,2-dimethoxypropane (DMP), triethylene glycol dimethyl ether (Triglyme), dimethyl sulfone (MSM) dimethyl ether (DME), ethylene sulfite (ES), propylene sulfite (PS), dimethyl sulfite (DMS), diethyl sulfite (DES), crown ether (12-crown-4), further optionally ethyl methyl carbonate. The ionic liquid may be selected from one or more of 1-ethyl-3-methylimidazolium hexafluorophosphate, 1-ethyl-3-methylimidazolium tetrafluoroborate, 1-ethyl-3-methylimidazolium bis[(trifluoromethyl)sulfonyl]imide, 1-propyl-3-methylimidazolium hexafluorophosphate, 1-propyl-3-methylimidazolium tetrafluoroborate, 1-propyl-3-methylimidazolium bis[(trifluoromethyl)sulfonyl]imide, 1-butyl-1-methylimidazolium hexafluorophosphate, 1-butyl-1-methylimidazolium tetrafluoroborate, 1-butyl-1-methylimidazolium bis[(trifluoromethyl)sulfonyl]imide, N-butyl-N-methylpyrrolidinium bis[(trifluoromethyl)sulfonyl]imide, 1-butyl-1-methylpyrrolidinium bis[(trifluoromethyl)sulfonyl]imide, N-methyl-N-propylpyrrolidinium bis[(trifluoromethyl)sulfonyl]imide, N-methyl, propyl piperidinium bis[(trifluoromethyl)sulfonyl]imide, N-methyl, butyl piperidinium bis[(trifluoromethyl)sulfonyl]imide.

In some embodiments of the present invention, since the film of metal phosphates which insulates against electrons and conducts metallic ions such as lithium ion is grown on the surface of the metal foil, the decomposition of the electrolyte solution is greatly reduced during the charging and discharging process of a battery, thereby improving charging and discharging efficiency and safety performance of the battery. Therefore, as for some solvents which are easily reduced in the anode during the charging and discharging process, although they cannot be applied to a conventional battery system alone, they can be used alone in the battery system of the present invention. For example, propylene carbonate (PC) cannot be applied to an existing battery system alone or in a large proportion, but it can be used alone in the battery system of the present invention.

In some embodiments of the present invention, an additive may be further added to the electrolyte solution so as to facilitate the formation of solid electrolyte interphase (SEI) on the surface of the anode, and improve the structural stability, service life and performance of the anode. The additive may be selected from one or more of an ester, a sulfone, an ether, a nitrile, and an olefin. For example, the additive may be selected from one or more of fluoroethylene carbonate, vinylene carbonate, vinylethylene carbonate, 1,3-propane sultone, 1,4-butane sultone, ethylene sulfate, propylene sulfate, ethylene sulfate, ethylene sulfite, propylene sulfite, dimethyl sulfite, diethyl sulfite, ethylene sulfite, methyl chloroformate, dimethyl sulfoxide, anisole, acetamide, diazabenzene, m-diazabenzene, 12-crown-4, 18-crown-6, 4-fluoroanisole, fluorinated chain ether, difluoromethyl ethylene carbonate, trifluoromethyl ethylene carbonate, chloroethylene carbonate, bromoethylene carbonate, trifluoroethyl phosphonate, bromobutyrolactone, fluoroacetoxyethane, phosphate, phosphite, phosphazene, ethanolamine, carbodiimide, cyclobutylsulfone, 1,3-dioxolane, acetonitrile, long-chain olefin, aluminum oxide, magnesium oxide, barium oxide, sodium carbonate, calcium carbonate, carbon dioxide, sulfur dioxide, and lithium carbonate, further optionally vinylene carbonate (VC). The percent by mass of the additive in the electrolyte solution is in a range of 0.1%-20%, further optionally in a range of 1%-6%.

Material for the separator is not limited, for example an insulating porous polymer film or an inorganic porous film, such as a porous polypropylene film, a porous polyethylene film, a porous composite polymer film, and insulating fiber paper or a porous ceramic separator, commonly used in the art can be used in some embodiments of the present invention. Insulating fiber separator such as a glass fiber separator is more preferred.

The secondary battery provided by the third aspect of the invention has better charging and discharging efficiency, cyclability, high power performance, high and low temperatures performance and safety performance.

In some embodiments of the present invention, the method for preparing the secondary battery may employ various methods known to those skilled in the art, for example, the following steps may be included:

(1) preparing a cathode plate: applying a cathode slurry onto a cathode current collector to prepare a cathode;

(2) preparing an anode: using the anode for the secondary battery described above in the first aspect as an anode;

(3) packaging: stacking sequentially or winding the cathode, a separator and the anode to prepare an electrode core, which is then packaged into a battery.

In such embodiment of the present invention, the step of packaging comprises placing the electrode core into a battery case, welding a cover to the battery case, adding electrolyte solution into the battery case, forming and sealing the battery. A technology commonly used in the art can be used to perform the steps of forming and sealing.

The present invention will be further described in detail with reference to the preferred embodiments thereof. It is understood that the specific embodiments described herein are merely illustrative of the invention and are not intended to limit the invention. The materials used in the examples and comparative examples were all commercially available.

Lithium Battery System Examples 1-38

A method for preparing an anode for a secondary battery comprises the following steps.

50-micron-thick aluminum foil was immersed in a 50% by mass phosphoric acid solution for 60 minutes. After the reaction, the aluminum foil was washed three times with pure water, and then dried in an oven at a constant temperature of 80° C. for 300 minutes to obtain an anode for secondary battery. At last, the anode for the secondary battery as prepared was cut into the required anode plates according to the battery design requirements.

Figure 1:
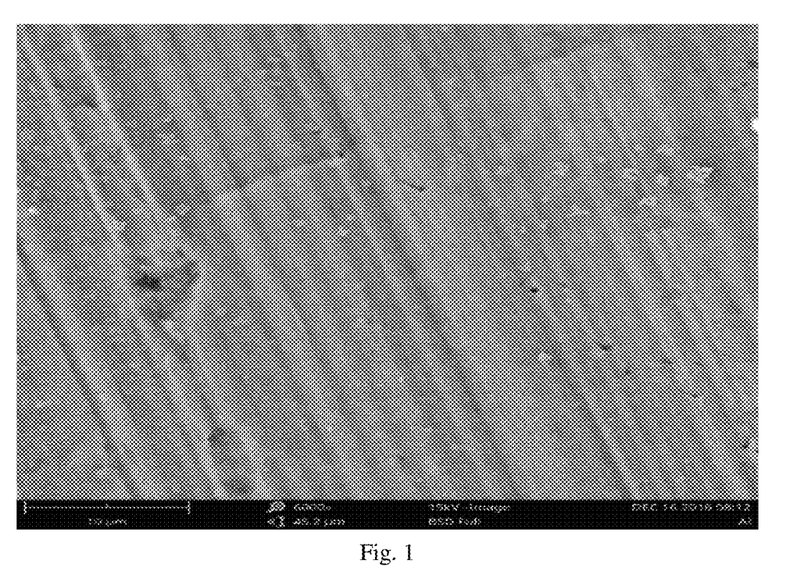
FIG. 1 is a scanning electron microscope (SEM) image of conventional aluminum foil.
Figure 2:
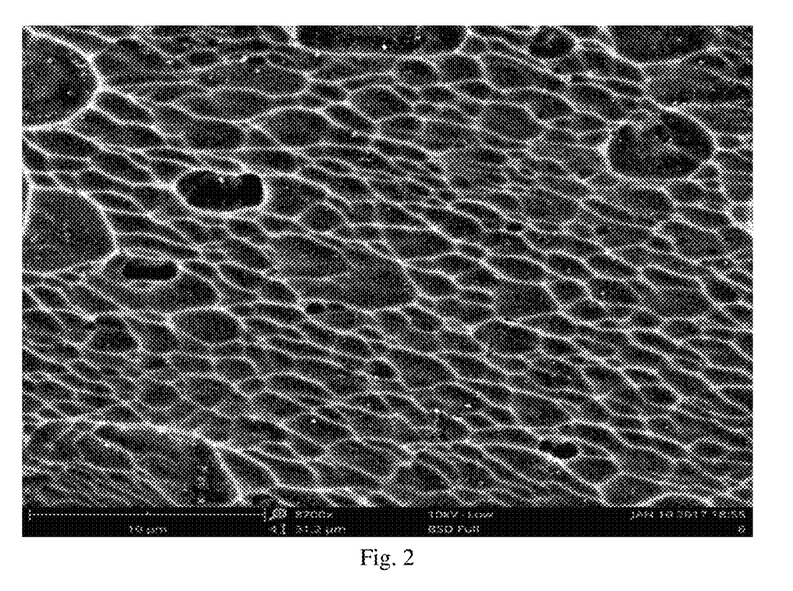
FIG. 2 is an SEM image of the anode for the secondary battery prepared in Example 1 of the present invention.
Figure 3:
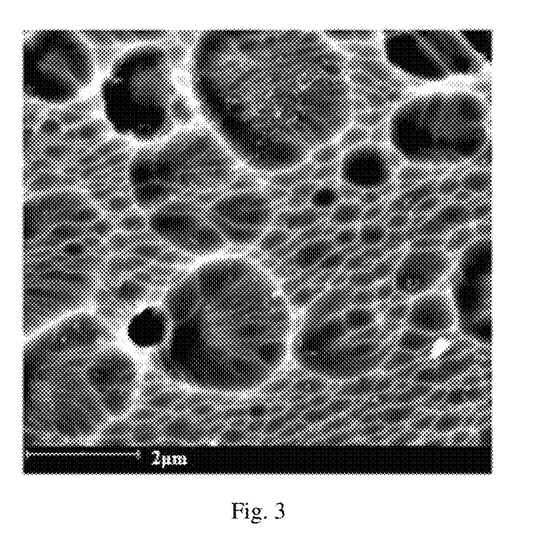
FIG. 3 is an enlarged view of an SEM image of the anode for the secondary battery prepared in Example 1 of the present invention.

FIG. 1 is a scanning electron microscope (SEM) image of conventional aluminum foil. FIG. 2 is an SEM image of the anode for the secondary battery prepared in Example 1 of the present invention. FIG. 3 is an enlarged view of an SEM image of the anode for the secondary battery prepared in Example 1 of the present invention. As shown in FIG. 1, FIG. 2 and FIG. 3, the surface of the treated aluminum foil is of a three-dimensional porous structure, which is advantageous for alleviating the volume expansion of the aluminum foil plate during the charging and discharging process of the battery and is advantageous for improving cyclability performance of the battery. Moreover, such porous structure facilitates intercalation and deintercalation of lithium ions, thereby improving the high power performance of the battery. It is possible to prepare a battery with high-capacity, high-performance by using such anode.

Figure 4:
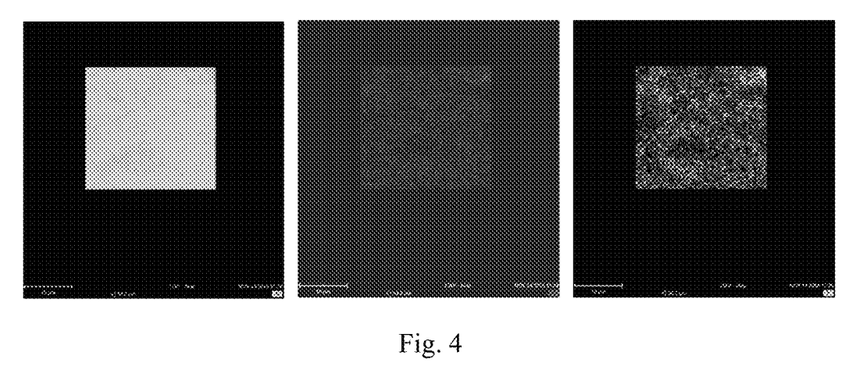
FIG. 4 is an energy dispersive X-ray spectroscopy (EDS) mapping on the surface of the anode for the secondary battery prepared in Example 1 of the present invention.

FIG. 4 is an energy dispersive X-ray spectroscopy (EDS) mapping on the surface of the anode for the secondary battery prepared in Example 1 of the present invention. We analyzed the surface of the aluminum foil by X-ray energy spectroscopy (EDS) in order to determine whether a film of aluminum phosphate existed on the aluminum foil that was treated with phosphoric acid. The results showed the existence of elements of phosphorus and oxygen on the surface of the aluminum foil, indicating the existence of the film of aluminum phosphate on the aluminum foil. Test results are shown in FIG. 4. The first map shows the distribution of the element of aluminum, the second map shows the distribution of the element of oxygen, and the third map shows the distribution of the element of phosphorus. The scale in the map is 10 μm. As can be seen from FIG. 4, the surface of the anode for secondary batter of the present invention contains phosphorus and oxygen elements, indicating that the film of aluminum phosphate is disposed on the surface of the aluminum foil.

Lithium Battery System Example 1

A lithium iron phosphate cathode material having a specific capacity of 140 mAh/g and PVDF and conductive carbon black at a ratio of 95:3:2 were coated on aluminum foil to prepare a cathode plate. The preparation of the cathode plate was conducted and controlled by a current process technology. Then a full battery was assembled in an argon filled glove box in a normal manner from the anode as prepared, the above cathode, an electrolyte solution which was a mixed solution of 1 mol/L LiPF6 in ethylene carbonate (EC) and dimethyl carbonate (DMC) with a volume ratio of 1:1, and a separator of celgard 2400 polypropylene porous membrane to obtain a battery sample C1.

Lithium Battery System Comparative Example 1

50-micron-thick aluminum foil was used as the anode. A lithium iron phosphate cathode material having a specific capacity of 140 mAh/g and PVDF and conductive carbon black at a ratio of 95:3:2 were coated on aluminum foil to prepare a cathode plate. The preparation of the cathode plate was conducted and controlled by a current process technology. Then a full battery was assembled in an argon filled glove box from the above cathode, the 50-micron-thick aluminum foil which was used as the anode, an electrolyte solution which was a mixed solution of 1 mol/L LiPF6 in ethylene carbonate (EC) and dimethyl carbonate (DMC) with a volume ratio of 1:1, and a separator of celgard 2400 polypropylene porous membrane to obtain a battery sample C0.

Other embodiments were conducted in accordance with Example 1 by adjusting the related parameters. The parameters and test results are shown in Table 1.

TABLE 1

The parameters and test results.

| Item | Cathode | Designed capacity of cathode | Phosphate-containing solution | reaction time (minute) | drying temperature (° C.) | drying time (minute) | Thickness of aluminum foil raw material (μm) | Efficiency during the first cycles (%) | Capacity retention after 500 cycles (%) |
|---|---|---|---|---|---|---|---|---|---|
| Ex. 1 | LFP | 140 | 50% phosphoric acid | 60 | 80 | 300 | 50 | 89.5 | 94 |
| Ex. 2 | LFP | 140 | 60% sodium dihydrogen phosphate | 200 | 60 | 200 | 100 | 88.5 | 93 |
| Ex. 3 | LCO | 140 | 70% sodium monohydrogen phosphate | 300 | 70 | 250 | 120 | 88.5 | 91.5 |
| Ex. 4 | LFP | 140 | 40% pyrophosphate | 100 | 90 | 240 | 110 | 89.5 | 92.5 |
| Ex. 5 | LFP | 140 | 10% metaphosphoric acid | 500 | 100 | 100 | 50 | 89 | 92.5 |
| Ex. 6 | LFP | 140 | 40% sodium pyrophosphate | 300 | 120 | 60 | 50 | 89 | 93 |
| Ex. 7 | LCO | 140 | 40% potassium pyrophosphate | 250 | 120 | 40 | 40 | 88.5 | 92 |
| Ex. 8 | LCO | 140 | 50% potassium dihydrogen phosphate | 120 | 80 | 40 | 40 | 89.5 | 92.5 |
| Ex. 9 | NCM | 160 | 60% potassium monohydrogen phosphate | 180 | 100 | 40 | 40 | 89 | 91.8 |
| Ex. 10 | NCM | 160 | 20% sodium metaphosphate | 240 | 120 | 40 | 30 | 89 | 92 |
| Ex. 11 | LCO | 140 | 15% potassium metaphosphate | 320 | 90 | 45 | 40 | 88.5 | 91.5 |
| Ex. 12 | LFP | 140 | 50% copper pyrophosphate + 30% phosphoric acid | 120 | 100 | 30 | 20 | 89 | 91.5 |
| Ex. 13 | LFP | 140 | 50% copper pyrophosphate | 600 | 110 | 50 | 40 | 89 | 92.1 |
| Ex. 14 | LFP | 140 | 15% potassium metaphosphate + 30% phosphoric acid | 540 | 105 | 65 | 25 | 88.5 | 92.5 |
| Ex. 15 | LFP | 140 | 20% sodium metaphosphate + 40% phosphoric acid | 60 | 95 | 55 | 16 | 86.5 | 93 |
| Ex. 16 | LFP | 140 | 40% potassium pyrophosphate + 50% potassium dihydrogen phosphate | 40 | 85 | 120 | 40 | 87 | 92 |
| Ex. 17 | LFP | 140 | 40% potassium pyrophosphate + 70% sodium monohydrogen phosphate | 50 | 90 | 120 | 50 | 87 | 88.5 |
| Ex. 18 | LFP | 140 | 40% potassium phosphate + 70% phosphoric acid | 60 | 120 | 130 | 18 | 87.5 | 90.5 |
| Ex. 19 | LCO | 140 | 40% potassium pyrophosphate + 30% sodium dihydrogen phosphate | 10 | 80 | 130 | 36 | 86 | 90.5 |
| Ex. 20 | LCO | 140 | 40% potassium phosphate + 60% pyrophosphate | 20 | 85 | 125 | 30 | 87.2 | 87.5 |
| Ex. 21 | LCO | 140 | 40% potassium pyrophosphate + 40% metaphosphoric acid | 30 | 95 | 125 | 25 | 86.5 | 88 |
| Ex. 22 | LCO | 140 | 40% potassium pyrophosphate + 60% potassium monohydrogen phosphate | 40 | 90 | 220 | 40 | 87 | 86 |
| Ex. 23 | LCO | 140 | 50% phosphoric acid + 20% tetrametaphosphoric acid | 50 | 80 | 120 | 60 | 87.5 | 87.5 |
| Ex. 24 | LCO | 140 | 50% phosphoric acid + 30% sodium hexametaphosphate | 60 | 100 | 200 | 20 | 88 | 88 |
| Ex. 25 | LCO | 140 | 50% phosphoric acid + 60% potassium metaphosphate | 70 | 110 | 200 | 30 | 88 | 88.5 |
| Ex. 26 | LCO | 140 | 50% phosphoric acid + 40% sodium pyrophosphate | 90 | 100 | 200 | 20 | 87.5 | 89 |
| Ex. 27 | LCO | 140 | 50% phosphoric acid + 35% potassium pyrophosphate | 100 | 95 | 320 | 20 | 86.5 | 88.5 |
| Ex. 28 | NCM | 160 | 50% phosphoric acid + 20% copper pyrophosphate | 110 | 85 | 360 | 70 | 86 | 88 |
| Ex. 29 | NCM | 160 | 50% phosphoric acid + 30% sodium dihydrogen phosphate | 120 | 105 | 350 | 30 | 86.2 | 89 |
| Ex. 30 | NCM | 160 | 50% phosphoric acid + 30% ammonium dihydrogen phosphate | 130 | 115 | 340 | 40 | 86.5 | 88.5 |
| Ex. 31 | NCM | 160 | 50% phosphoric acid + 60% sodium monohydrogen phosphate | 560 | 95 | 430 | 50 | 86.5 | 89 |
| Ex. 32 | NCM | 160 | 85% phosphoric acid | 120 | 105 | 420 | 80 | 88.7 | 88.5 |
| Ex. 33 | NCM | 160 | 40% phosphoric acid | 200 | 115 | 420 | 40 | 87.2 | 88 |
| Ex. 34 | NCM | 160 | 20% phosphoric acid | 360 | 105 | 220 | 16 | 86.5 | 89 |
| Ex. 35 | NCM | 160 | 10% phosphoric acid | 480 | 90 | 425 | 40 | 86.5 | 87.5 |
| Ex. 36 | NCM | 160 | 5% phosphoric acid | 500 | 80 | 540 | 90 | 87 | 87.5 |
| Ex. 37 | NCM | 160 | 20% pyrophosphoric acid | 380 | 95 | 545 | 40 | 86.5 | 88 |
| Ex. 38 | NCM | 160 | 60% pyrophosphoric acid | 50 | 100 | 540 | 30 | 87 | 89.5 |

TABLE 1-continued

The parameters and test results.

| Item | Cathode | Designed capacity of cathode | Phosphate-containing solution | reaction time (minute) | drying temperature (° C.) | drying time (minute) | Thickness of aluminum foil raw material (μm) | Efficiency during the first cycles (%) | Capacity retention after 500 cycles (%) |
|---|---|---|---|---|---|---|---|---|---|
| Comparative Ex. 1 | LFP | 140 | 0 | 0 | 105 | 575 | 50 | 78 | 80 |

(Note:
LFP = Lithium iron phosphate; LCO = Lithium cobaltate; NCM = Nickel cobalt manganese ternary material; when the phosphate-containing solution contains two compounds, the volume ratio of the two compounds is 1:1. As in Example 12, 50% copper pyrophosphate + 30% phosphoric acid means that a solution of copper pyrophosphate having a mass fraction of 50% is mixed with a solution of phosphoric acid having a mass fraction of 30% at a volume ratio of 1:1 to form a phosphate-containing solution.)

It can be seen from Table 1 that the growth of a layer of aluminum phosphate compound on the surface of the aluminum foil may efficiently improve the charging and discharging efficiency and cyclability of the battery.

Aluminum-Graphite Dual-Ion Battery System Examples 1-38

A method for preparing an anode for a secondary battery comprises the following steps.

50-micron-thick aluminum foil was immersed in a 50% by mass phosphoric acid solution for 60 minutes. After the reaction, the aluminum foil was washed three times with pure water, and then dried in an oven at a constant temperature of 80° C. for 300 minutes to obtain an anode for the secondary battery. At last, the anode for the secondary battery as prepared was cut into the required anode plates according to the battery design requirements.

Aluminum-Graphite Dual-Ion Battery System Example 1

A graphite cathode material having a specific capacity of 100 mAh/g and PVDF and conductive carbon black at a ratio of 95:3:2 were coated on aluminum foil to prepare a cathode plate. The preparation of the cathode plate was conducted and controlled by a current process technology. Then a full battery was assembled in an argon filled glove box in a normal manner from the anode as prepared, the above cathode, an electrolyte solution which was a mixed solution of 4 mol/L LiPF6 in ethylene carbonate (EC) and dimethyl carbonate (DMC) with a volume ratio of 1:1+2% vinylene carbonate (VC), and a separator of celgard 2400 polypropylene porous membrane to obtain a battery sample C10.

COMPARATIVE EXAMPLE 1

50-micron-thick aluminum foil was used as the anode. A graphite cathode material having a specific capacity of 100 mAh/g and PVDF and conductive carbon black at a ratio of 95:3:2 were coated on aluminum foil to prepare a cathode plate. The preparation of the cathode plate was conducted and controlled by a current process technology. Then a full battery was assembled in an argon filled glove box from the cathode plate, the aluminum foil which was used as an anode plate, an electrolyte solution which was a mixed solution of 4 mol/L LiPF6 in ethylene carbonate (EC) and dimethyl carbonate (DMC) with a volume ratio of 1:1+2% vinylene carbonate (VC), and a separator of celgard 2400 polypropylene porous membrane to obtain a battery sample C00.

Other embodiments of a dual-ion battery were conducted in accordance with Example 1 by adjusting the related parameters. The parameters and test results are shown in Table 2.

TABLE 2

The parameters and test results.

| Item | Cathode | Designed capacity of cathode | Phosphate-containing solution | reaction time (minute) | drying temperature (° C.) | drying time (minute) | Thickness of aluminum foil raw material (μm) | Efficiency during the first cycles (%) | Capacity retention after 500 cycles (%) |
|---|---|---|---|---|---|---|---|---|---|
| Ex. 1 | Graphite | 100 | 50% phosphoric acid | 60 | 80 | 300 | 50 | 89.5 | 90 |
| Ex. 2 | Graphite | 100 | 60% sodium dihydrogen phosphate | 200 | 60 | 200 | 100 | 88.5 | 91 |
| Ex. 3 | Graphite | 100 | 70% sodium monohydrogen phosphate | 300 | 70 | 250 | 120 | 88.5 | 90.5 |
| Ex. 4 | Graphite | 100 | 40% pyrophosphoric acid | 100 | 90 | 240 | 110 | 88.5 | 91.5 |
| Ex. 5 | Graphite | 100 | 10% metaphosphoric acid | 500 | 100 | 100 | 50 | 88 | 91.5 |
| Ex. 6 | Graphite | 100 | 40% sodium pyrophosphate | 300 | 110 | 60 | 50 | 88 | 92 |
| Ex. 7 | Graphite | 100 | 40% potassium pyrophosphate | 250 | 120 | 40 | 40 | 87.5 | 91 |
| Ex. 8 | Graphite | 100 | 50% potassium dihydrogen phosphate | 120 | 80 | 40 | 40 | 88.5 | 90.5 |
| Ex. 9 | Graphite | 100 | 60% potassium monohydrogen phosphate | 180 | 100 | 40 | 40 | 88 | 90.8 |
| Ex. 10 | Graphite | 100 | 20% sodium metaphosphate | 240 | 120 | 40 | 30 | 88 | 90 |
| Ex. 11 | Graphite | 100 | 15% potassium metaphosphate | 320 | 90 | 45 | 40 | 87.5 | 89.5 |
| Ex. 12 | Graphite | 100 | 50% copper pyrophosphate + 30% phosphoric acid | 120 | 100 | 30 | 20 | 88 | 89.5 |
| Ex. 13 | Graphite | 100 | 50% copper pyrophosphate | 600 | 110 | 50 | 40 | 88 | 90.1 |
| Ex. 14 | Graphite | 100 | 15% potassium metaphosphate + 30% phosphoric acid | 540 | 105 | 65 | 25 | 87.5 | 90.5 |
| Ex. 15 | Graphite | 100 | 20% sodium metaphosphate + 40% phosphoric acid | 60 | 95 | 55 | 16 | 85.5 | 91 |

TABLE 2-continued

The parameters and test results.

| Item | Cathode | Designed capacity of cathode | Phosphate-containing solution | reaction time (minute) | drying temperature (° C.) | drying time (minute) | Thickness of aluminum foil raw material (μm) | Efficiency during the first cycles (%) | Capacity retention after 500 cycles (%) |
|---|---|---|---|---|---|---|---|---|---|
| Ex. 16 | Graphite | 100 | 40% potassium pyrophosphate + 50% potassium dihydrogen phosphate | 40 | 85 | 120 | 40 | 86 | 90 |
| Ex. 17 | Graphite | 100 | 40% sodium phosphate + 70% sodium monohydrogen phosphate | 50 | 90 | 120 | 50 | 86 | 89.5 |
| Ex. 18 | Graphite | 100 | 40% potassium phosphate + 70% phosphoric acid | 60 | 110 | 130 | 18 | 85.5 | 89.5 |
| Ex. 19 | Graphite | 100 | 40% potassium pyrophosphate + 30% sodium dihydrogen phosphate | 10 | 80 | 130 | 36 | 84 | 90.5 |
| Ex. 20 | Graphite | 100 | 40% potassium pyrophosphate + 60% pyrophosphoric acid | 20 | 85 | 125 | 30 | 85.2 | 89.5 |
| Ex. 21 | Graphite | 100 | 40% potassium pyrophosphate + 40% metaphosphoric acid | 30 | 95 | 125 | 25 | 84.5 | 89 |
| Ex. 22 | Graphite | 100 | 40% potassium pyrophosphate + 60% potassium monohydrogen phosphate | 40 | 90 | 220 | 40 | 85.5 | 89 |
| Ex. 23 | Graphite | 100 | 50% phosphoric acid + 20% tetrametaphosphoric acid | 50 | 80 | 120 | 60 | 85.5 | 89.5 |
| Ex. 24 | Graphite | 100 | 50% phosphoric acid + 30% sodium hexametaphosphate | 60 | 100 | 200 | 20 | 86 | 90 |
| Ex. 25 | Graphite | 100 | 50% phosphoric acid + 60% potassium metaphosphate | 70 | 110 | 200 | 30 | 86 | 89.5 |
| Ex. 26 | Graphite | 100 | 50% phosphoric acid + 40% sodium pyrophosphate | 90 | 100 | 200 | 20 | 85.5 | 90 |
| Ex. 27 | Graphite | 100 | 50% phosphoric acid + 35% potassium pyrophosphate | 100 | 95 | 320 | 20 | 84.5 | 89.5 |
| Ex. 28 | Graphite | 100 | 50% phosphoric acid + 20% copper pyrophosphate | 110 | 85 | 360 | 70 | 85 | 90 |
| Ex. 29 | Graphite | 100 | 50% phosphoric acid + 30% sodium dihydrogen phosphate | 120 | 105 | 350 | 30 | 84.2 | 90.5 |
| Ex. 30 | Graphite | 100 | 50% phosphoric acid + 30% ammonium dihydrogen phosphate | 130 | 115 | 340 | 40 | 84.5 | 89.5 |
| Ex. 31 | Graphite | 100 | 50% phosphoric acid + 60% sodium monohydrogen phosphate | 560 | 95 | 430 | 50 | 84.5 | 91 |
| Ex. 32 | Graphite | 100 | 85% phosphoric acid | 120 | 105 | 420 | 80 | 83.7 | 92 |
| Ex. 33 | Graphite | 100 | 40% phosphoric acid | 200 | 115 | 420 | 40 | 83.2 | 90 |
| Ex. 34 | Graphite | 100 | 20% phosphoric acid | 360 | 105 | 220 | 16 | 83.5 | 89 |
| Ex. 35 | Graphite | 100 | 10% phosphoric acid | 480 | 90 | 425 | 40 | 84.5 | 89.5 |
| Ex. 36 | Graphite | 100 | 5% phosphoric acid | 500 | 80 | 540 | 90 | 84 | 89.5 |
| Ex. 37 | Graphite | 100 | 20% pyrophosphoric acid | 380 | 95 | 545 | 40 | 84.5 | 90 |
| Ex. 38 | Graphite | 100 | 60% pyrophosphoric acid | 50 | 100 | 540 | 30 | 84 | 89.5 |
| Comparative Ex. 1 | Graphite | 100 | 0 | 0 | 80 | 300 | 50 | 75 | 87 |

(Note:
when the phosphate-containing solution contains two compounds, the volume ratio of the two compounds is 1:1. As in Example 12, 50% copper pyrophosphate + 30% phosphoric acid means that a solution of copper pyrophosphate having a mass fraction of 50% is mixed with a solution of phosphoric acid having a mass fraction of 30% at a volume ratio of 1:1 to form a phosphate-containing solution.)

It can be seen from Table 2 that the growth of a layer of aluminum phosphate compound on the surface of the aluminum foil may efficiently improve the charging and discharging efficiency and cyclability of the battery.

Other Foil-Graphite Dual-Ion Battery System Examples 1-16

Other foil of different materials was assembled with graphite into a battery for test. For each of the foil, a comparison was made between phosphoric acid treatment and no phosphoric acid treatment. Other embodiments were conducted in accordance with Example 1 by adjusting the related parameters. The parameters and test results are shown in Table 3.

TABLE 3

The parameters and test results.

| | | Electrochemical properties | | | |
| --- | --- | --- | --- | --- | --- |
| Item | Cathode | Efficiency during the first cycles (%), without phosphoric acid treatment | Efficiency during the first cycles (%), with phosphoric acid treatment | Cycles, at a capacity retention of 85%, without phosphoric acid treatment | Cycles, at a capacity retention of 85%, with phosphoric acid treatment |
| Ex. 1 | Aluminum foil | 75 | 90.5 | 550 | 1000 |
| Ex. 2 | Tin foil | 73.5 | 89 | 400 | 910 |
| Ex. 3 | Copper-tin foil | 82.5 | 91 | 560 | 1200 |
| Ex. 4 | Zinc foil | 70 | 87.5 | 500 | 980 |
| Ex. 5 | Copper foil | 65 | 82 | 750 | 1450 |
| Ex. 6 | Iron foil | 67.5 | 84 | 700 | 1500 |
| Ex. 7 | Nickel foil | 62.5 | 80 | 720 | 1580 |
| Ex. 8 | Titanium foil | 68 | 85 | 700 | 1500 |
| Ex. 9 | Manganese foil | 55 | 86 | 450 | 980 |
| Ex. 10 | Aluminum-tin alloy | 72.5 | 90 | 450 | 880 |
| Ex. 11 | Aluminum-titanium alloy | 69.5 | 88.5 | 500 | 1100 |
| Ex. 12 | Iron-tin alloy | 68.5 | 89 | 480 | 950 |
| Ex. 13 | Lead foil | 58.5 | 82.5 | 540 | 900 |
| Ex. 14 | Cadmium foil | 61 | 85 | 500 | 950 |
| Ex. 15 | Antimony foil | 66.5 | 87 | 450 | 800 |
| Ex. 16 | Bismuth foil | 64.5 | 86 | 480 | 860 |

It can be seen from Table 3 that the battery assembled from the anode which is made from the metal foil treated by phosphoric acid has improved efficiency during the first few cycles and cyclability performance.

While particular embodiments and aspects of the present disclosure have been illustrated and described herein, various other changes and modifications can be made without departing from the scope of the disclosure. Accordingly, it is therefore intended that the appended claims cover all such changes and modifications that are within the scope of the embodiments shown and described herein.

What is claimed is:

1. An anode for a secondary battery, comprising metal foil and a compact film of metal phosphates disposed on a surface of the metal foil;
    wherein the metal foil is configured to be both an anode current collector and an anode active material, and the metal foil comprises any one of aluminum, copper, iron, tin, zinc, nickel, manganese, lead, antimony, cadmium and bismuth, or comprises an alloy containing at least one of aluminum, copper, iron, tin, zinc, nickel, manganese, lead, antimony, cadmium and bismuth, and
    wherein the compact film of metal phosphates comprises one or more of aluminum phosphate, copper phosphate, iron phosphate, tin phosphate, zinc phosphate, nickel phosphate, manganese phosphate, lead phosphate, antimony phosphate, cadmium phosphate and bismuth phosphate.

2. The anode for the secondary battery of claim 1, wherein a metallic element of the film of metal phosphates is the same as a metallic element of the metal foil.

3. The anode for the secondary battery of claim 1, wherein a surface layer of the metal foil has a three-dimensional porous structure with a pore size in a range of 10 nm-20 μm.

4. The anode for the secondary battery of claim 3, wherein the surface layer has a thickness in a range of 1 nm-10 μm, and a ratio of the thickness of the surface layer to that of the metal foil is in a range of 1:10-10000.

5. The anode for the secondary battery of claim 1, wherein the film of metal phosphates has a thickness of 1 nm-3 μm, and a ratio of the thickness of the film of metal phosphates to that of the metal foil is in a range of 1:30-10000.

6. A method for preparing an anode for a secondary battery, comprising:
    providing a raw material for metal foil;
    reacting the raw material for metal foil with a phosphate-containing solution, alternatively
    forming a compact film of metal phosphates on a surface of the raw material for metal foil by depositing so as to prepare the anode for the secondary battery;
    wherein the anode for the secondary battery comprises metal foil and the compact film of metal phosphates disposed on a surface of the metal foil, and
    wherein the metal foil is configured to be both an anode current collector and an anode active material, and the metal foil comprises any one of aluminum, copper, iron, tin, zinc, nickel, manganese, lead, antimony, cadmium and bismuth, or comprises an alloy containing at least one of aluminum, copper, iron, tin, zinc, nickel, manganese, lead, antimony, cadmium and bismuth, and
    wherein the compact film of metal phosphates comprises one or more of aluminum phosphate, copper phosphate, iron phosphate, tin phosphate, zinc phosphate, nickel phosphate, manganese phosphate, lead phosphate, antimony phosphate, cadmium phosphate and bismuth phosphate.

7. The method for preparing an anode for the secondary battery of claim 6, wherein the step of reacting the raw material for metal foil with a phosphate-containing solution comprises:

immersing the raw material for metal foil in the phosphate-containing solution at a temperature of 0° C.-80° C. for 1-600 minutes, followed by washing and drying it to obtain the anode for the secondary battery.

8. The method for preparing an anode for the secondary battery of claim 7, wherein the phosphate-containing solution comprises at least one of a solution of phosphoric acid, a solution of dihydrogen phosphate, a solution of monohydrogen phosphate, a solution of pyrophosphoric acid, a solution of pyrophosphate, a solution of metaphosphoric acid, and a solution of metaphosphate, and the percent by mass of the solute in the phosphate-containing solution is in a range of 5%-85%.

9. The method for preparing an anode for the secondary battery of claim 7, wherein the step of drying is performed at 40° C.-120° C. for 30-600 minutes.

10. A secondary battery comprising a cathode, an electrolyte solution, a separator, and the anode of any one of claims 1-5.

11. The secondary battery of claim 10, wherein the electrolyte solution comprises an electrolyte and a solvent, the electrolyte comprising one or more of a salt of lithium, a salt of sodium, a salt of potassium, a salt of magnesium and a salt of calcium, and the concentration of the electrolyte in the electrolyte solution is in a range of 0.1-10 mol/L.

* * * * *